Oct. 29, 1968
J. L. MAY ET AL
3,407,418
RETRIEVER APPARATUS
Filed Aug. 29, 1966
2 Sheets-Sheet 1
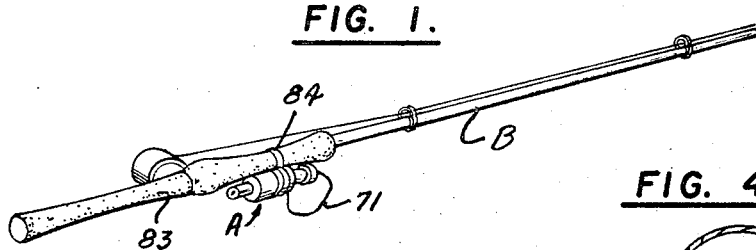
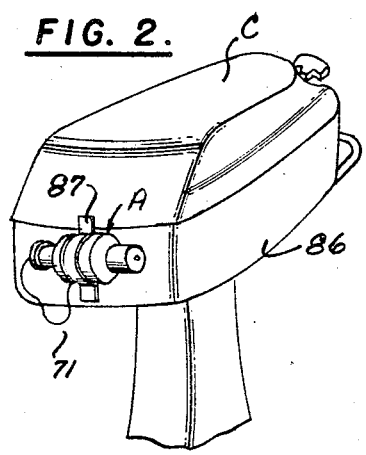
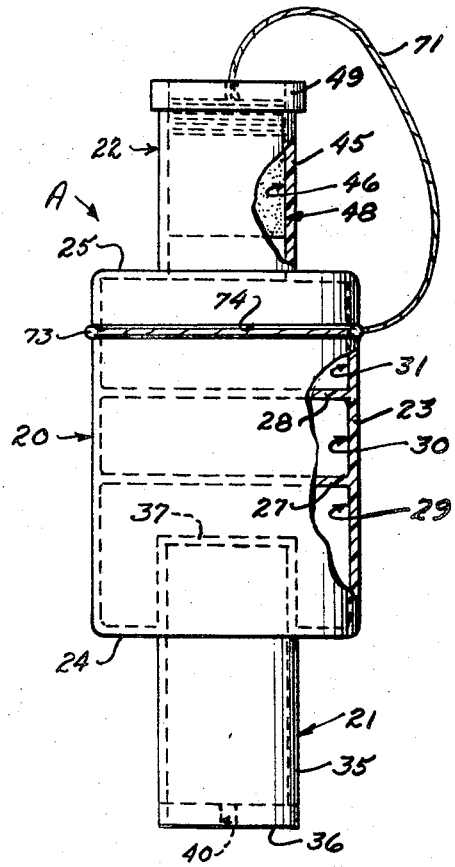
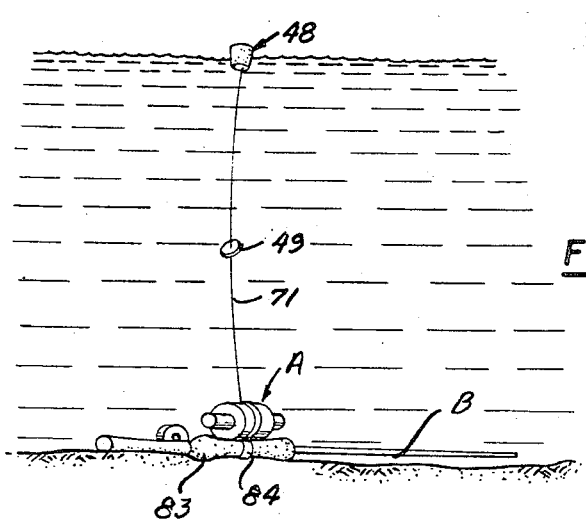
INVENTORS
James L. May
James A. Stephens, Jr.
BY *Rommel, Allwine and Rommel*
ATTORNEYS

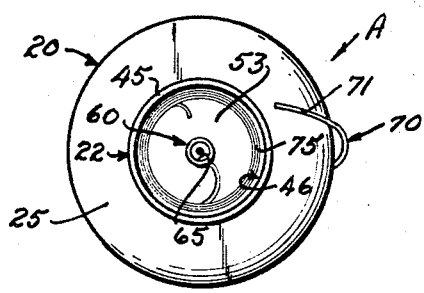
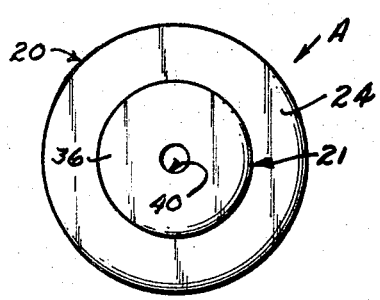
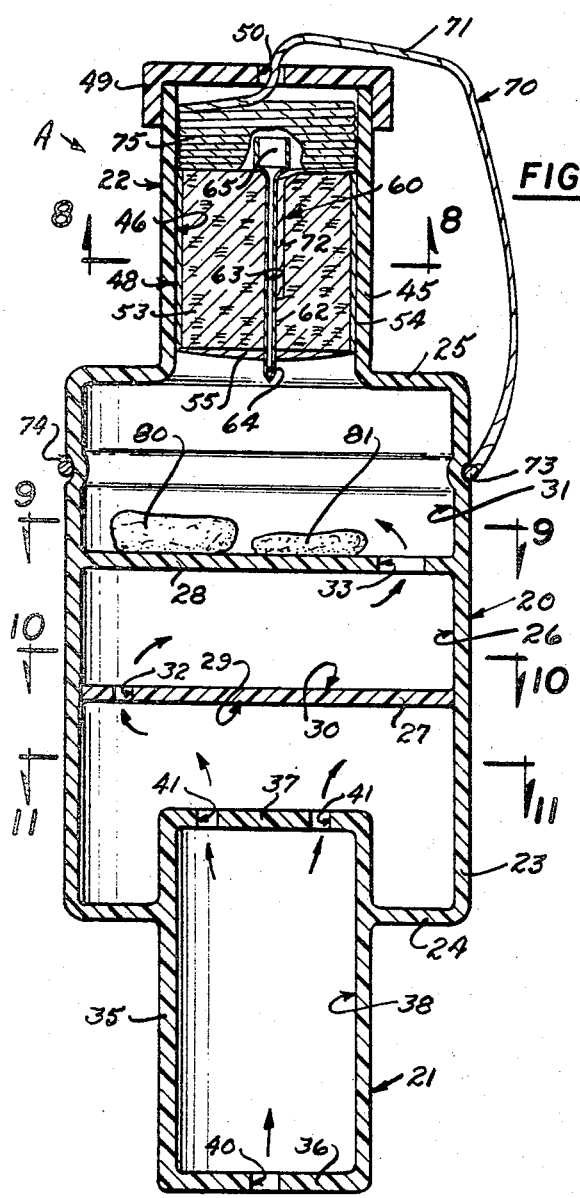
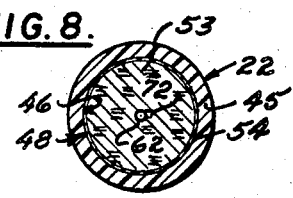
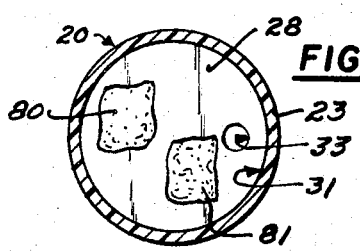
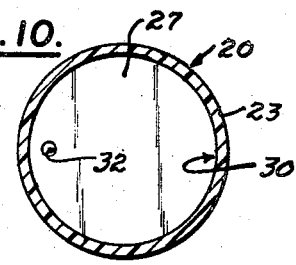
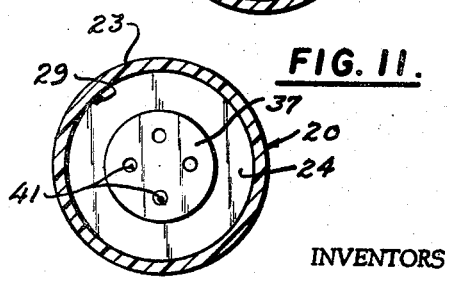

United States Patent Office 3,407,418
Patented Oct. 29, 1968

3,407,418
RETRIEVER APPARATUS
James L. May Box 200 J, Bell Drive, and James A. Stephens, Jr., 3313 N. Monroe St., both of Tallahassee, Fla. 32301
Filed Aug. 29, 1966, Ser. No. 575,714
5 Claims. (Cl. 9—9)

ABSTRACT OF THE DISCLOSURE

Retriever apparatus comprising a casing having a float and including a compartment having a chemical therewithin which generates a gas in expulsion of said float from the casing on fluid submersion of the apparatus.

---

This invention relates to improvements in retriever apparatus for locating submerged articles.

In the use of various articles in the practice of water sports and activities, the articles being used, such as fishing gear, rifles, shotguns, outboard motors, etc., are apt to be dropped or fall overboard and sink to the bottom. Due to craft movement on the water, tides, currents, etc., it is usually virtually impossible to accurately mark the location at which the object was dropped overboard. This is true even when the water may be fairly shallow, but is somewhat murky. The primary object of the present invention is the provision of retriever apparatus by which the location of the submerged object may be accurately determined.

It will be readily appreciated that retriever apparatus of this character is preferably capable of being manufactured in different sizes, for instance, a fairly compact size for attachment to a fishing rod and a larger size for attachment to an outboard motor. Also, since the retriever apparatus will be subjected to many different forces and ranges of movement during attachment, such as motor vibrations, whip of the fishing rod in casting, and recoil in shooting, the retriever apparatus preferably contains a minimum number of moving parts which are likely to be affected by various forces of movement. It is thus a further object of our invention to provide retriever apparatus which may be manufactured in various sizes, according to the equipment with which it is to be used, and is not reliant on mechanically operated parts.

A further object of the invention is the provision of retriever apparatus including float means and a water actuated chemical for generating a gas in ejection of the float means, and wherein water flow for activation of the chemical actuator is unrestricted by any mechanical devices which require a predetermined water pressure in order to permit flow of water, so that the retriever apparatus will be equally operable in both deep and shallow water.

A further object is the provision of a casing for retriever apparatus using a gas generating, water activated chemical for expulsion of the float means thereof and including baffle means so that the primary force of the generated gas will be toward expulsion of the float means, with the baffle means inhibiting back flow of water through the water intake opening.

A further object is the provision of retriever apparatus including float means and a line interconnected at one end thereof to the float means and at the other end thereof to the main casing of the retriever apparatus, and wherein the line is stored within the casing of the retriever apparatus for ejection thereof upon expulsion of the float means so that the float means may freely float to the water surface without overcoming a drag such as might be required by unwinding of the line from a reel.

A further object is the provision of improved float means which is luminous for facile location at night and includes a dye marker for facile location in large bodies of water.

A further object is the provision of a compartmented retriever apparatus which includes moisture absorbent means for absorbing incidental moisture usually encountered in water sports or activities and is thus rendered operable only under conditions of virtually complete submersion of the retriever apparatus.

Other objects and advantages of the invention will become apparent during the course of the following detailed description, taken in connection with the accompanying drawings, forming part of this specification, and in which drawings:

FIG. 1 is a view showing attachment of our improved retriever apparatus to a fishing rod.

FIG. 2 is a view showing attachment of our improved retriever apparatus to an outboard motor.

FIG. 3 is a view showing our improved retriever apparatus in condition for location of the submerged fishing rod of FIG. 1.

FIG. 4 is a side view, partly in section, of our improved retriever apparatus.

FIG. 5 is a top view of our improved retriever apparatus, the top thereof being removed to show preferred details.

FIG. 6 is a bottom view of our improved retriever apparatus.

FIG. 7 is an enlarged vertical sectional view of our improved retriever apparatus.

FIGS. 8, 9, 10 and 11 are transverse sectional views taken substantially on the lines 8—8, 9—9, 10—10 and 11—11 of FIG. 7.

In the drawings, wherein for the purpose of illustration is shown a preferred embodiment of the invention, and wherein similar reference characters designate corresponding parts throughout the several views, the letter A may generally designate our improved retriever apparatus which may be used in connection with articles such as fishing gear B and outboard motor C.

Retriever apparatus A is preferably in the nature of an elongated hollow casing having a cylindrical main body portion 20, intake end 21 and float receiving end 22.

Main body portion 20 preferably includes cylindrical side wall portion 23, lower wall portion 24, and upper wall portion 25, which define an elongated chamber 26. A plurality of partitions, 27 and 28, are provided transversely across chamber 26, dividing the same into a plurality of compartments 29, 30 and 31. Partition 27 is provided with a passageway 32 for flow of water from compartment 29 to compartment 30, and partition 28 is provided with a passageway 33 for flow of water from compartment 30 to compartment 31, as will be subsequently described.

Intake end 21 preferably includes a cylindrical side wall portion 35, lower wall portion 36, and upper wall portion 37 which define a compartment 38. As shown in FIG. 7, one end of side wall portion 35 preferably extends into compartment 29 and, together with upper wall portion 37, comprises an extension of lower wall 24 of main body portion 20 in forming the lowermost wall of compartment 29.

Lower wall 36 of intake end 21 is provided with an ingress passageway 40 for flow of water into compartment 38 and upper wall portion 37 of intake end 21 is provided with a plurality of passageways 41 for flow of water from compartment 38 to compartment 29, as will be subsequently described.

Float receiving end 22 preferably includes a cylindrical side wall portion 45 which provides an open ended elongated cylindrical chamber 46 for receiving float means 48. A removable top 49 having a central passageway 50 may be provided over one open end of chamber 46, the other end thereof opening directly into compartment 31 of main body portion 20.

As shown in the drawings, the preferred form of the invention contemplates that the elongated hollow casing of retriever apparatus A be unitary construction which may be molded of transparent plastic. In this type of unitary construction, it is anticipated that the casing would be molded into a pair of elongated sections that would be longitudinally cemented together to form a unitary one-piece construction. It is, of course, within the scope of the invention to provide a segmental construction in which intake end 21 and/or float receiving end 22 were removably interconnected to main body portion 20.

Float means 48 preferably comprises an elongated cork 53, the outer wall thereof being provided with a luminous coating 54, such as a luminous paint, which would render the same readily visible at night. One end of cork 53 may be coated with a dye marker 55, such as fluorescein, which is soluble in water, and will enable facile location of the float in large bodies of water.

As shown in FIG. 7, cork 53 is received within chamber 46 of float receiving end 22, the lowermost end thereof providing an extension of upper wall 25 of main body portion 20 in forming the uppermost wall of compartment 31. Dye marker 55 is applied to the end of cork 53 which is adjacent compartment 31, protecting such dye marker against dissolving prior to ejection of cork 53 from float receiving end 22.

Relief valve means 60 is preferably mounted on float means 48 and received in float receiving end 22. Relief valve means 60 preferably includes an elongated cylindrical stem 62 having a longitudinally extending flow passageway 63 therethrough. As shown in FIG. 7, stem 62 preferably extends longitudinally through cork 53 with passageway 63 opening at 64 into compartment 31 and opening at 65 for venting through passageway 50 of cover 49.

Tether means 70 is preferably provided for interconnection of float means 48 to main body portion 20.

Tether means 70 preferably comprises wax coated nylon line 71, one end of which is interconnected to float means 48 as at 72, the other end thereof being looped about main body portion 20 as at 73. Main body portion 20 may be provided with a peripheral groove 74 for holding loop 73 in a particular position thereabout. As shown in FIG. 7, the main length of line 71 may be coiled as at 75 within float receiving end 22, between the uppermost end of cork 53 and cover 49.

For actuation of our retriever apparatus upon submersion of the same, we preferably provide a packet 80 in compartment 31, packet 80 containing a chemical which, upon exposure to water entering compartment 31, reacts with the water to form a gas which will serve to eject float means 48 from float receiving end 22. As to the chemical of packet 80, we preferably use one of the alkali metals. We have found that the reaction of water with the alkali metals forms a gas which will serve to eject float means 48 from float receiving end 22.

It is to be noted that there are no mechanically operated valves required for actuation of our retriever apparatus. To this end, and in view of the fact that some incidental atmospheric moisture might find its way through passageway 40 in intake end 21 or passageway 50 in float receiving end 22, and thence into compartment 31, we preferably provide a moisture absorbent packet 81 in compartment 31. The moisture absorbent packet 81 preferably contains a moisture absorbing chemical, such as sodium sulphate and/or charcoal, and will serve to prevent unwanted or premature activation of the chemical of packet 80. Of course, as a further precaution to entry of moisture into compartment 31, moisture absorbent packets 80 might be provided also in compartments 29 and 30.

It is to be noted that passageways 41 leading to compartment 29 are remote from intake passageway 40 and are not longitudinally aligned therewith; that passageway 32 is remote from and not longitudinally aligned with passageways 41; and that passageway 33 is remote from and not longitudinally aligned with passageway 32. Thus, water entering passageway 40 and thence flowing through passageways 41, 32 and 33 to compartment 31 is compelled to traverse a circuitous path and, upon generation of gas within compartment 31 by contact of water with packet 80, the partitions dividing the various compartments comprise baffle means which resist back pressure flow of water from compartment 31 so that the main force of expansion of the gas within compartment 31 will be directed toward expulsion of float means 38.

As shown in FIG. 1 retriever apparatus A may be attached to handle 83 of fishing rod B by a bracket 84; and, as shown in FIG. 2, retriever apparatus A may be interconnected to housing 86 of outboard motor C by bracket 87. Any conventional attaching means may be used for mounting of retriever apparatus A on the article with which it is to be associated.

When the article to which retriever apparatus A is connected is dropped or falls overboard and becomes submerged, as shown in FIG. 3, water enters passageway 40 and flows into and through compartment 38, passageways 41, compartment 29, passageway 32, compartment 30, and passageway 33 to compartment 31 where it reacts with the chemical of packet 80 in forming a gas which blows float means 48 out of float receiving end 22. As the water flows through the various compartments and passageways to compartment 31, it is obvious that some means must be provided for the escape of air from the compartments in advance of water flow therethrough. It is to this end that we have provided relief valve means 60, so that air escaping in advance of water flow enters opening 64 of relief valve means 60, through restricted passageway 63 and out of opening 65 thereof through passageway 50, to exteriorly of retriever apparatus A. When water flows into compartment 31 and reacts with the chemical of packet 80, gas is generated rapidly and, with some of the alkali metals, such as cesium, almost explosively, gas being generated so fast that no appreciable amount escapes through relief valve means 60. Since the major length of tether means 70 is preferably coiled within float receiving end 22 adjacent cover 49, it will be seen that as float means 48 is ejected, the same will blow off cover 49 and eject coils 75 of tether means 70. Float means 48 will then float to the surface, as shown in FIG. 3, such floating being a free float, unencumbered by any drag such as would be encountered if tether means 70 were coiled about a reel. Upon ejection of float means 48 from receiving end 22, dye marker 55 is activated, causing a wide area of discoloration in the water, so that the float may be readily located. In the event that the object to which retriever apparatus is attached is submerged at night, the luminous coating 54 will provide for facile location of the same.

Our improved retriever apparatus has been primarily designed and will undoubtedly be most readily accepted in connection with retrieval of articles from water. However, it is obvious that the same could be adapted for retrieval of articles from other fluids, it only being necessary to provide a chemical in packet 80 which will react with the fluid of submersion in forming a gas for ejection of float means 48. It is likewise obvious that packet 80 and/or 81 could be formed as a tablet, encapsulated, or otherwise provided within compartment 31.

It is likewise not essential that float means 48 be a cork. It may be a luminous plastic float, or any other form of device which is capable of functioning in the manner as previously described.

Various changes may be made to the form of the in-

We claim:

1. In retriever apparatus for locating submerged articles, the combination of an elongated hollow casing having an intake end and a float receiving end, said hollow casing including a plurality of spaced apart partitions extending transversely thereacross and dividing the same into a plurality of separate compartments, an ingress passageway leading from said intake end for discharge into said compartments, a chemical which forms a gas upon contact therewith of the fluid in which the apparatus is submerged disposed in one of said compartments remote from said ingress passageway, said partitions having passageways leading to the compartments on each side thereof for flow of the fluid of submersion from said ingress passageway and through said partition passageways to said last mentioned compartment, the passageway of each partition being remote from the passageway of the next adjacent partition in a non-aligned, staggered relationship whereby said partitions comprise baffle means resisting back pressure flow of the fluid of submersion upon formation of gas by said chemical, said float receiving end opening into said compartment receiving said chemical, said float receiving end including relief valve means for exit of air therefrom and from said compartments ahead of the fluid of submersion entering through said ingress passageway of said intake end, float means removably mounted in said float receiving end for expulsion therefrom on formation of gas by said chemical, and tether means interconnected at one end thereof to said float means and at the other end thereof to said casing.

2. Retriever apparatus as specified in claim 1 wherein the major length of said elongated tether means is stored in said float receiving end in juxtaposition for complete expulsion of the entire length of said tether means stored within said float receiving end contemporaneously with ejection of said float means therefrom.

3. In retriever apparatus for locating submerged articles, the combination of an elongated hollow casing having an intake end and a float receiving end, said hollow casing including a plurality of spaced apart partitions extending transversely thereacross and dividing the same into a plurality of separate compartments, an ingress passageway leading from said intake end for discharge into said compartments, a chemical which forms a gas upon contact therewith of the fluid in which the apparatus is submerged disposed in one of said compartments remote from said ingress passageway, said partitions having passageways leading to the compartments on each side thereof for flow of the fluid of submersion from said ingress passageway and through said partition passageways to said last mentioned compartment, the passageway of each partition being remote from the passageway of the next adjacent partition in a non-aligned, staggered relationship whereby said partitions comprise baffle means resisting back pressure flow of the fluid of submersion upon formation of gas by said chemical, said float receiving end opening into said compartment receiving said chemical, said float receiving end including relief valve means for exit of air from said retriever apparatus ahead of the fluid of submersion entering through said ingress passageway of said intake end, float means removably mounted in said float receiving end for expulsion therefrom on formation of gas by said chemical, said float means comprising a closure at said float receiving end for the compartment opening thereinto and said relief valve comprising an elongated member having a restricted flow passageway, said elongated member extending through said float means with one end of said flow passageway opening to said compartment receiving said chemical on one side of said float means and the other end thereof opening to the opposite side of said float means for egress of air through said float receiving end.

4. Retriever apparatus as specified in claim 10 wherein said ingress passageway of said intake end and said passageways of said partitions are unrestricted for free flow of the fluid of submersion from said ingress passageway of said intake end to said compartment having said chemical therein.

5. In retriever apparatus for locating submerged articles, the combination of an elongated hollow casing having an intake end and a float receiving end, said hollow casing including a plurality of spaced apart partitions extending transversely thereacross and dividing the same into a plurality of separate compartments, an ingress passageway leading from said intake end for discharge into said compartments, a chemical which forms a gas upon contact therewith of the fluid in which the apparatus is submerged disposed in one of said compartments remote from said ingress passageway, said partitions having passageways leading to the compartments on each side thereof for flow of the fluid of submersion from said ingress passageway and through said partition passageways to said last mentioned compartment, said ingress passageway of said intake end and said passageways of said partitions being unrestricted for free flow of the fluid of submersion from said ingress passageway of said intake end to said compartment having said chemical therein, the passageway of each partition being remote from the passageway of the next adjacent partition in a non-aligned, staggered relationship whereby said partitions comprise baffle means resisting back pressure flow of the fluid of submersion upon formation of gas by said chemical, said float receiving end opening into said compartment receiving said chemical, float means removably mounted in said float receiving end for expulsion therefrom on formation of gas by said chemical, and tether means interconnected at one end thereof to said float means and at the other end thereof to said casing.

References Cited

UNITED STATES PATENTS

| | | | |
|---|---|---|---|
| 2,636,193 | 4/1953 | Savary | 9—9 |
| 2,938,488 | 5/1960 | Hathaway | 9—9 X |
| 3,210,785 | 10/1965 | Ward | 9—9 |
| 3,303,521 | 2/1967 | Mix | 9—9 |
| 3,313,268 | 4/1967 | Reiffel | 9—9 X |

MILTON BUCHLER, *Primary Examiner.*

T. MAJOR, *Assistant Examiner.*